(12) United States Patent
Kawasaki

(10) Patent No.: US 8,503,951 B2
(45) Date of Patent: Aug. 6, 2013

(54) ANTENNA INSTALLATION METHOD IN A MULTIPLE INPUT MULTIPLE OUTPUT COMMUNICATION METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 12/704,501

(22) Filed: Feb. 11, 2010

(65) Prior Publication Data

US 2010/0248663 A1    Sep. 30, 2010

(30) Foreign Application Priority Data

Mar. 31, 2009   (JP) ................................. 2009-087245

(51) Int. Cl.
*H04B 1/02* (2006.01)
*H04B 1/06* (2006.01)

(52) U.S. Cl.
USPC ......................................... 455/103; 455/269

(58) Field of Classification Search
USPC ................... 455/7, 11.1, 101, 103, 269, 272, 455/560, 561; 370/310, 315, 328
See application file for complete search history.

(56) References Cited

U.S. PATENT DOCUMENTS

| 7,498,997 | B2 * | 3/2009 | Moon et al. ................... 343/834 |
| 7,525,939 | B2 | 4/2009 | Abe |
| 8,005,034 | B2 * | 8/2011 | Dankberg et al. ............. 370/315 |
| 8,059,583 | B2 * | 11/2011 | Yang ............................. 370/328 |
| 8,130,693 | B2 * | 3/2012 | Miller et al. .................. 370/316 |
| 2006/0105730 | A1 * | 5/2006 | Modonesi et al. ............ 455/273 |

FOREIGN PATENT DOCUMENTS

| JP | 2006-33305 | 2/2006 |
| JP | 2006-148867 | 6/2006 |
| JP | 2006-295433 | 10/2006 |

* cited by examiner

*Primary Examiner* — Quochien B Vuong
(74) *Attorney, Agent, or Firm* — Fujitsu Patent Center

(57) ABSTRACT

A communication system includes a first communication apparatus and a second communication apparatus. The second communication apparatus transmits different signals from first and second antennas, and first and second antennas of the first communication apparatus receive the signals, respectively. An angle formed by a first line connecting the first communication apparatus and the first antenna of the second communication apparatus and a second line connecting the first communication apparatus and the second antenna of the second communication apparatus is set to be equal to or smaller than 180 degrees. A distance between the first and second antennas of the first communication apparatus is set to a specified value, which is determined by a signal wavelength and the angle formed by the first line and the second line.

12 Claims, 16 Drawing Sheets

ANTENNA INSTALLATION METHOD IN A MULTIPLE INPUT MULTIPLE OUTPUT COMMUNICATION METHOD

CROSS-REFERENCE TO RELATED APPLICATIONS

This application is based upon and claims the benefit of priority of the prior Japanese Patent Application No. 2009-087245, filed on Mar. 31, 2009, the entire contents of which are incorporated herein by reference.

FIELD

The present invention relates to an antenna installation technique suitable for a Multiple Input Multiple Output (MIMO) communication method.

BACKGROUND

In recent years, with increased demand for speeding up in a radio communication system, an attempt has been made to achieve a multilevel modulation and demodulation or a multicarrier modulation and demodulation. However, because the frequency allocation used in a radio communication system is limited, there is a limitation in attempting the multicarrier modulation and demodulation. Thus, a radio communication system using a Multiple Input Multiple Output (MIMO) communication method has been developed. According to the MIMO communication method, transmission data is previously divided into a plurality of signals (streams), and the divided signals are simultaneously transmitted through a plurality of antennae in the same frequency band.

FIG. 1 illustrates a conventional radio communication system 10 using a MINO communication method (refer to Patent Document 1).

A transmitter station 11 includes a transmission signal processing part (not illustrated in the figure), a modulating part (not illustrated in the figure), a transmission amplifier (not illustrated in the figure), and a plurality of antennas 12A and 12B. Transmission data is divided into a plurality of signals in the transmission signal processing part. The divided signals are modulated by the modulating part, and are amplified by the transmission amplifier to have a desired power. Then, the amplified signals are transmitted through the antennas 12A and 12B.

A receiver station 15 includes a receiver amplifier (not illustrated in the figure), a demodulating part (not illustrated in the figure), a reception signal processing part (not illustrated in the figure) and a plurality of antennas 16A and 16B. Signals received by the antennae 16A and 16B are amplified by the reception amplifier, and demodulated by the demodulating part to be reception data. The thus-processed reception data is subjected to a separation process using a channel response matrix in the reception signal processing part.

A transmission rate according to the MIMO communication method is proportional to the number of antennas. Thus, it is possible to increase the transmission rate while using the same frequency and the same time.

Patent Document 1: Japanese Laid-Open Patent Application No. 2006-295433

According to MIMO communication method, if a multipath signals come from a large angle range and if there is an antenna interval equal to or greater than a half-wavelength, the elements of the channel response matrix vary without correlation. Under such a condition, the transmission capacity of the radio communication system is increased.

However, there is a problem in that a transmission capacity is small in a case where there is no local scattering in a line-of-sight communication because the elements of the channel response matrix do not vary without correlation unless the antenna interval is large.

SUMMARY

There is provided according to one aspect an antenna installation method in a radio communication system that is configured and arranged to transmit different signals from a plurality of antennas of a second communication apparatus using the same frequency band and receives the signals by a plurality of antennas of a first communication apparatus, the antennas of the first communication apparatus including at least first and second antennas, the antennas of the second communication apparatus including at least first and second antennas, the antenna installation method comprising: setting an angle formed by a first line connecting the first communication apparatus and the first antenna of the second communication apparatus and a second line connecting the first communication apparatus and the second antenna of the second communication apparatus to be equal to or smaller than 180 degrees; and setting a first distance between the first communication apparatus and the first antenna of the second communication apparatus and a second distance between the first communication apparatus and the second antenna of the second communication apparatus to be specified values determined by a signal wavelength and the angle formed by the first line and the second line, respectively.

There is provided according to another aspect a communication apparatus configured to communicate with another communication apparatus using a communication method in which different signals are transmitted from a plurality of antennas of the communication apparatus and the signals are received by a plurality of antennas of the another communication apparatus, the communication apparatus comprising: a first antenna; and a second antenna arranged in a specified positional relationship with the first antenna, wherein an angle formed by a first line connecting the another communication apparatus and the first antenna and a second line connecting the another communication apparatus and the second antenna is set to be equal to or smaller than 180 degrees; and a distance between a first antenna and a second antenna of the another communication apparatus is set to a specified value, which is determined by a signal wavelength and the angle formed by the first line and the second line.

There is provided according to a further aspect a communication apparatus configured to communicate with another communication apparatus using a communication method in which different signals are transmitted from a plurality of antennas of the communication apparatus and the signals are received by a plurality of antennas of the another communication apparatus, the communication apparatus comprising: a first antenna; and a second antenna arranged in a specified positional relationship with the first antenna, wherein an angle formed by a first line connecting the communication apparatus and a first antenna of the another communication apparatus and a second line connecting the communication apparatus and a second antenna of the another communication apparatus is set to be equal to or smaller than 180 degrees; and a distance between the first and second antennas of the communication apparatus is set to a specified value, which is determined by a signal wavelength and the angle formed by the first line and the second line.

There is provided according to another aspect a communication system comprising: a first communication apparatus having at least a first antenna and a second antenna that are arranged in a specified positional relationship; and a second communication apparatus having at least a first antenna and a second antenna that are arranged in a specified positional relationship, wherein the second communication apparatus transmits different signals from the first and second antennas of the second communication apparatus, and the first and second antennas of the first communication apparatus receive the signals, respectively, and wherein an angle formed by a first line connecting the first communication apparatus and the first antenna of the second communication apparatus and a second line connecting the first communication apparatus and the second antenna of the second communication apparatus is set to be equal to or smaller than 180 degrees; and a distance between the first and second antennas of the first communication apparatus is set to a specified value, which is determined by a signal wavelength and the angle formed by the first line and the second line.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

A description will now be given, with reference to the drawings, of embodiments of the present invention.

Figure 1:
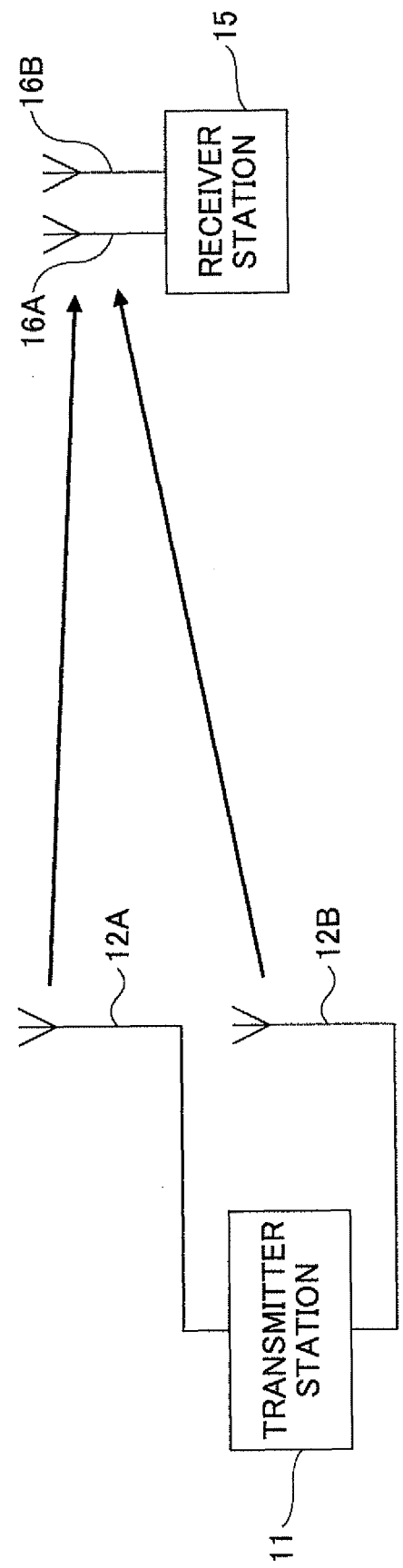
FIG. 1 is an illustration of a conventional radio communication system using a MINO communication method.
Figure 2:
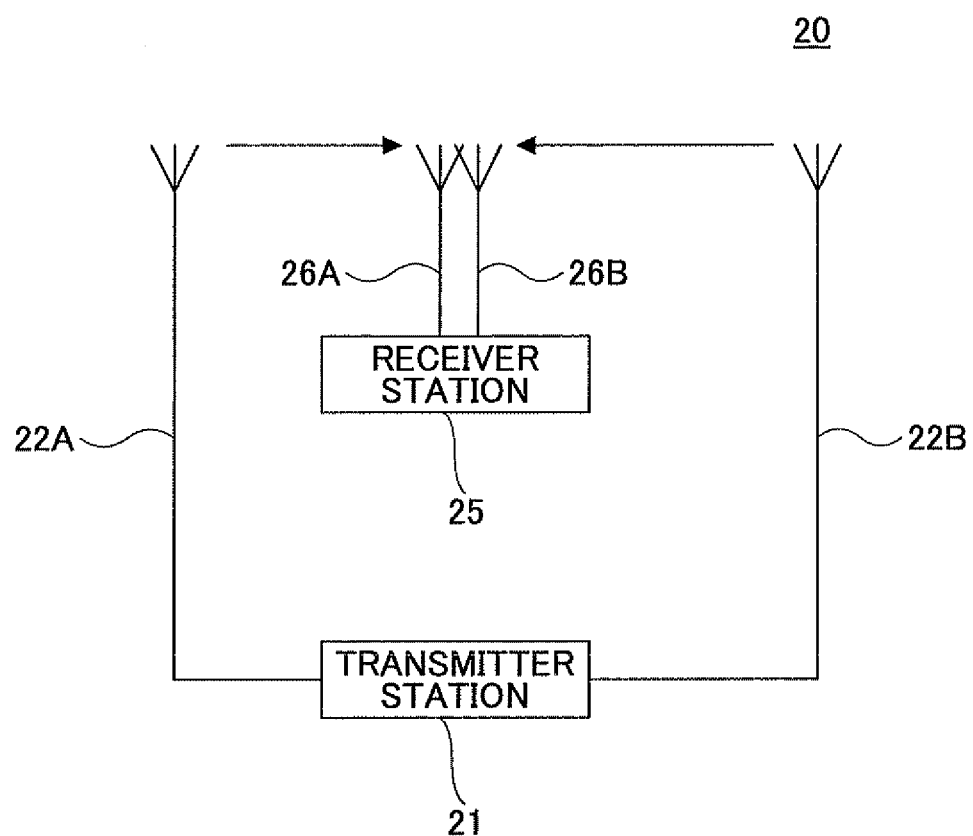
FIG. 2 is an illustration of a radio communication system according to a first embodiment.

FIG. 2 is an illustration of a radio communication system 20 according to a first embodiment. The radio communication system 20 includes a radio transmitter station 21 equipped with antennas 22A and 22B, and a radio receiver station 25 equipped with antennas 26A and 26B. The radio receiver station 25 is arranged between the antenna 22A and the antenna 22B of the radio transmitter station 21. The antennas 26A and 26B of the receiver station 25 are arranged on a straight line connecting the antenna 22A and the antenna 22B of the transmitter station 21.

Figure 3:
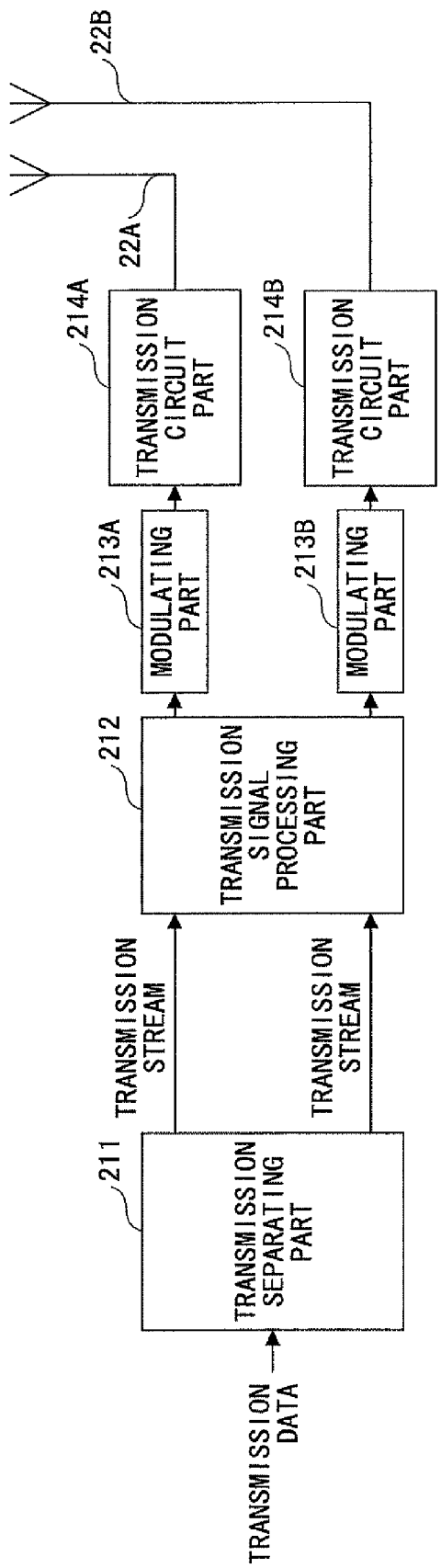
FIG. 3 is a block diagram illustrating a structure of a transmitter station according to the first embodiment.

FIG. 3 is a block diagram illustrating a structure of the transmitter station 21 according to the first embodiment. The transmitter station 21 includes, in addition to the antennas 22A and 22B, a transmission separating part 211, a transmission signal processing part 212, modulating parts 213A and 213B, and transmission circuit parts 214A and 214B. Transmission data is divided into transmission streams of a number the same as the number of the antennas by the transmission separating part 211. The transmission streams are signal-processed by the transmission signal processing part 212. The signal-processed transmission streams are modulated by the modulating parts 213A and 213B, respectively. Then, the modulated transmission streams are amplified by the transmission circuit parts 214A and 214B, and transmitted through the antennas 22A and 22B, respectively.

Figure 4:
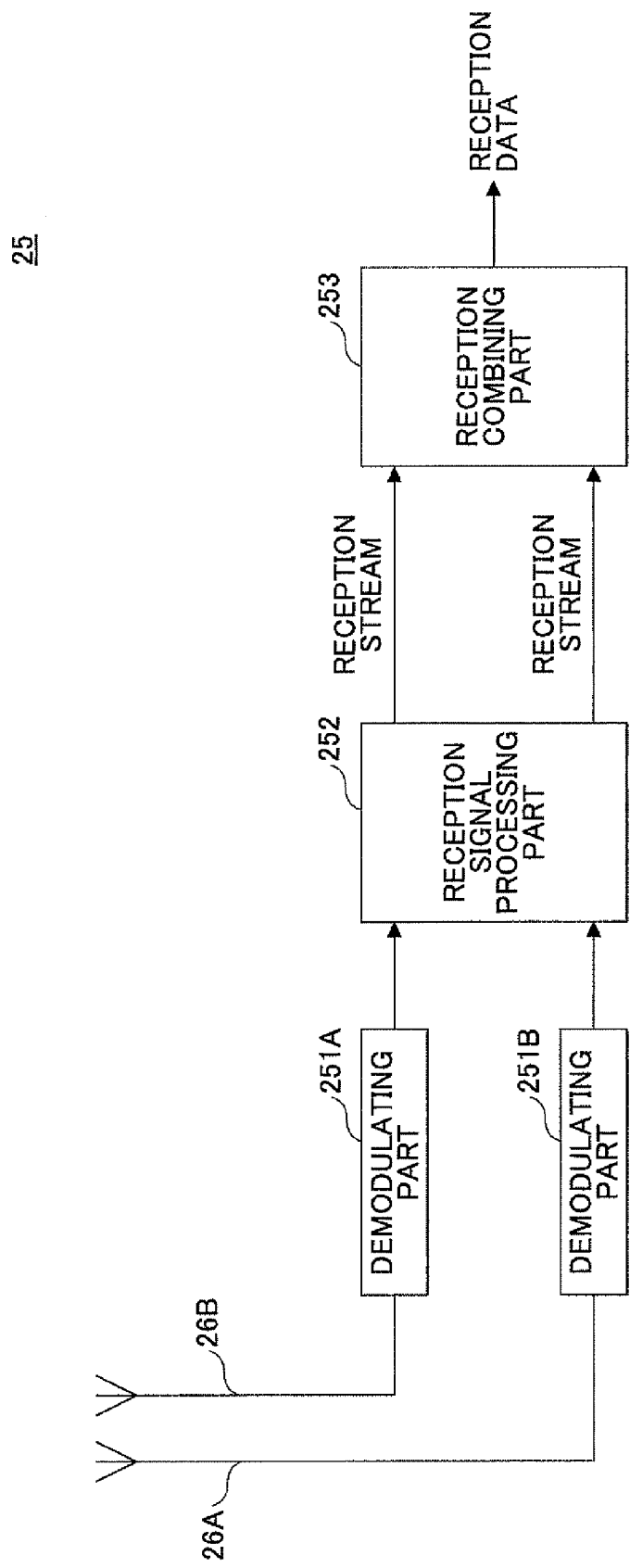
FIG. 4 is a block diagram illustrating a structure of a receiver station according to the first embodiment.

FIG. 4 is a block diagram illustrating a structure of the receiver station 25 (FIG. 2) according to the first embodiment. The receiver station 25 includes, in addition to the antennas 26A and 26B, demodulating parts 251A and 251B, a reception signal processing part 252, and a reception combining part 253. Signals received by the antennas 26A and 26B are amplified and demodulated by the demodulating parts 251A and 251B, respectively. The demodulated signals are separated into reception streams of a number the same as the number of antennas by the reception signal processing part 252 using a channel response matrix. The separated reception streams are combined together by the reception combining part 253.

A description will be given below of signals transmitted and received between the transmitter station 21 and the receiver station 25 in the case where the antennas 22A and 22B of the transmitter station 21 and the antennas 26A and 26B of the receiver station 25 are arranged as illustrated in FIG. 2.

Figure 5:
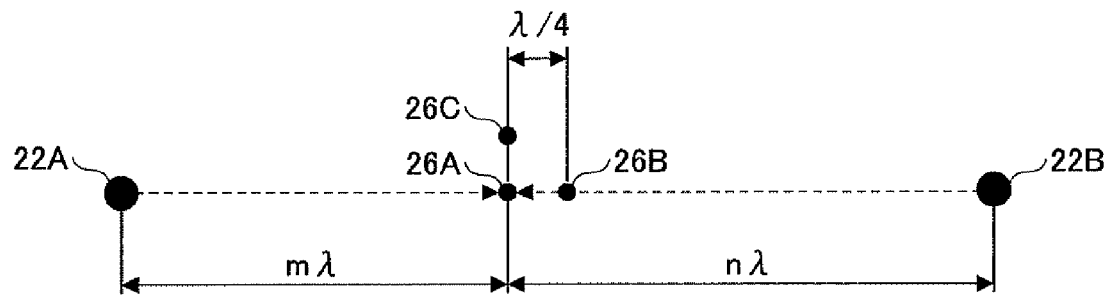
FIG. 5 is an illustration illustrating a positional relationship between the antennas of the transmitter station and the antennas of the receiver station.

FIG. 5 is an illustration illustrating a positional relationship between the antennas 22A and 22B of the transmitter station 21 and the antennas 26A and 26B of the receiver station 25. A signal x is transmitted from the antenna 22A of the transmitter station 21, and a signal y is transmitted from the antenna 22B of the transmitter station 21. The signals x and y are received by the antennas 26A and 26B of the receiver station 25. Here, it is assumed that a distance between the antenna 22A of the transmitter station 21 and the antenna 26A of the receiver station 25 is $m\lambda$, and a distance between the antenna 22B of the transmitter station 21 and the antenna 26A of the receiver station 25 is $n\lambda$. $\lambda$ is a wavelength of the signals. m and n are arbitrary positive integers, and m can be equal to n (m=n). It is also assumed that an interval between the antennas 26A and 26B of the receiver station 25 is $\lambda/4$.

For the sake of simplification of explanation, a transmission loss of a signal is ignored in the following explanation. Additionally, although the numerical values m and n are set to integers for the sake of simplification of explanation, the numerical values m and n may be set to arbitrary values other than integers.

When the antenna 26A of the receiver station 25 receives the signal x transmitted from the antenna 22A of the transmitter station 21, the reception signal is x because the distance between the antenna 22A and the antenna 26A is mλ. On the other hand, when the antenna 26A of the receiver station 25 receives the signal y transmitted from the antenna 22B of the transmitter station 21, the reception signal is y because the distance between the antenna 22B and the antenna 26A is nλ. Thus, the reception signal $r_1$ at the antenna 26A of the receiver station 25 is expressed by the following formula (1).

$$r_1 = x + y \quad (1)$$

When the antenna 26B of the receiver station 25 receives the signal x transmitted from the antenna 22A of the transmitter station 21, the reception signal is expressed as $x \cdot \exp(-j\pi/2)$ because the distance between the antenna 22B and the antenna 26A is $m\lambda + \lambda/4$ and there is a phase delay of $\lambda/4$, that is, $\pi/2$. On the other hand, when the antenna 26B of the receiver station 25 receives the signal y transmitted from the antenna 22B of the transmitter station 21, the reception signal $r_2$ is expressed as $y \cdot \exp(j\pi/2)$ because the distance between the antenna 22B and the antenna 26B is $n\lambda - \lambda/4$ and there is a phase lead of $\lambda/4$, that is, $\pi/2$.

$$r_2 = x \cdot e^{-j(\pi/2)} + y \cdot e^{j(\pi/2)} \quad (2)$$

Here, a phase rotation of $\pi/2$ is given to the reception signal $r_2$ of the antenna 26B of the receiver station 25. The signal given the phase rotation is expressed by the following formula (3).

$$r_2 \cdot e^{j(\pi/2)} = x - y \quad (3)$$

By acquiring a sum and a difference of the formula (1) and the formula (3), the signal x transmitted from the antenna 22A and the signal y transmitted from the antenna 22B can be separated easily from each other as the following formulas (4a) and (4b).

$$r_1 + r_2 \cdot e^{j(\pi/2)} = x + y + x - y = 2x \quad (4a)$$

$$r_1 - r_2 \cdot e^{j(\pi/2)} x + y - x + y = 2y \quad (4b)$$

As explained above, the reception signal $r_1$ of the antenna 26A and the reception signal $r_2$ of the antenna 26B can be orthogonalized to each other by arranging the antennas 26A and 26B of the receiver station 25 on the line connecting the antennas 22A and 22B of the transmitter station 21 with an antenna interval of $\lambda/4$.

Although the antenna interval is set to $\lambda/4$ in the above explanation, the antenna interval may be set as $\lambda/4 + N\lambda$ (N is a positive integer).

Moreover, the signal x transmitted from the antenna 22A and the signal y transmitted from the antenna 22B of the transmitter station 21 can be separated from each other easily by using a means such as an algorithm referred to as QRM-MLD known in the present technical field. QRM-MLD is an algorithm for reducing an amount of operation processes of the maximum-likelihood detector using QR factorization and M algorithm. If it is assumed that there is a third antenna 26C in the receiver station 25 and the radio frequency from the transmitter station 21 is a parallel wave, a reception signal $r_3$ at the antenna 26C of the receiver station 25 is expressed by the following formula (5).

$$r_3 = x + y \quad (5)$$

The reception signal $r_1$ of the antenna 26A of the receiver station 25 and the reception signal $r_3$ of the antenna 26C of the receiver station 25 are the same, and it is difficult to separate the signal x transmitted from the antenna 22A of the transmitter station 21 and the signal y transmitted by the antenna 22B of the transmitter station 21 from each other.

As mentioned above, according to the antenna installation method according to the present embodiment, an angle between the line connecting the receiver station 25 and the antenna 22A of the transmitter station 21 and the line connecting the receiver station 25 and the antenna 22B of the transmitter station 21 is set to 180 degrees.

Although the distance between the antenna 22A and the antenna 26A is set to mλ and the distance between the antenna 22B and the antenna 26A is set to nλ in the present embodiment for the sake of easy understanding in the above explanation, those distances are not limited to mλ and nλ, and arbitrary distances may be used.

A description will now be given of a second embodiment.

Figure 6:
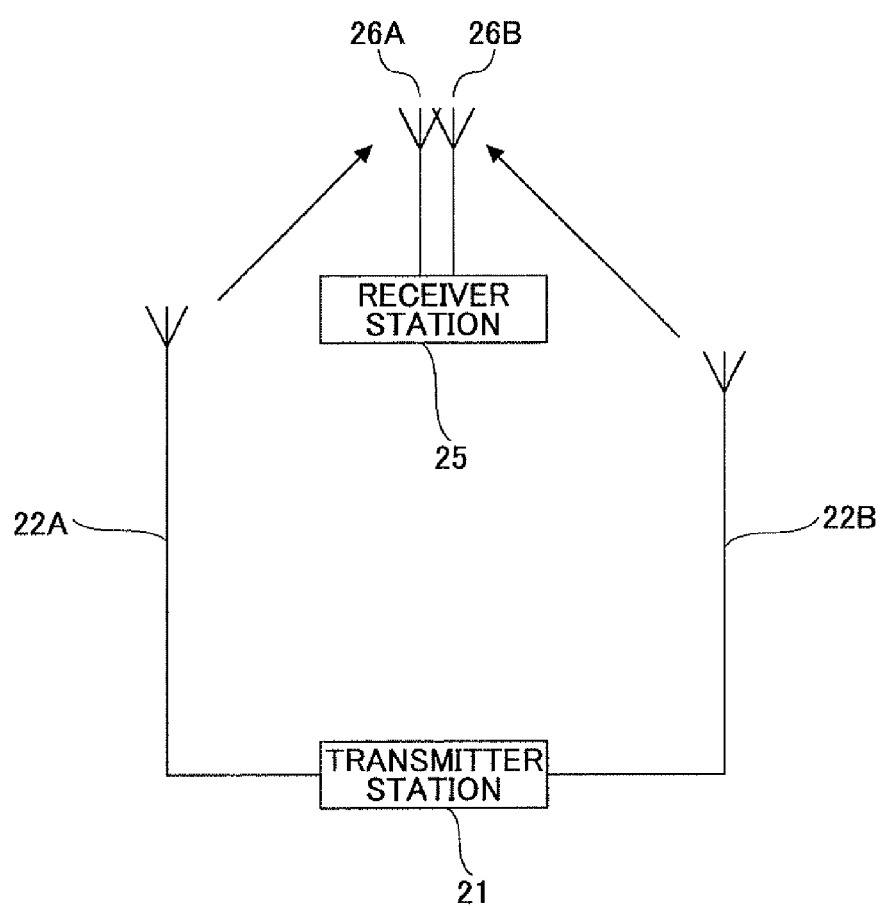
FIG. 6 is an illustration illustrating a structure of a radio communication system according to a second embodiment.

FIG. 6 is an illustration illustrating a structure of a radio communication system 60 according to the second embodiment. In the radio communication system 60, the radio receiver station 25 is arranged between the transmitting antennas 22A and 22B of the radio transmitter station 21 similar to the first embodiment. However, in the present embodiment, the antennas 26A and 26B of the receiver station 25 are not arranged on the line connecting the antennas 22A and 22B of the transmitter station 21.

Figure 7:
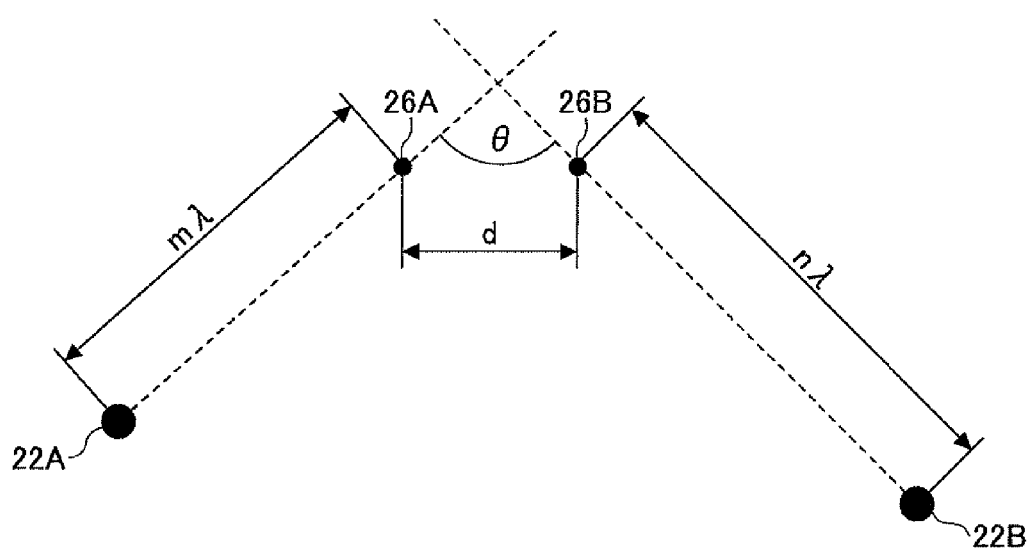
FIG. 7 is an illustration illustrating a positional relationship between antennas of a transmitter station and antennas of a receiver station illustrated in FIG. 6.

FIG. 7 is an illustration illustrating a positional relationship between the antennas 22A and 22B of the transmitter station 21 and the antennas 26A and 26B of the receiver station 25 illustrated in FIG. 6.

A signal x is transmitted from the antenna 22A of the transmitter station 21, and a signal y is transmitted from the antenna 22B of the transmitter station 21. The signals x and y are received by the antennas 26A and 26B of the receiver station 25. Here, it is assumed that a distance between the antenna 22A of the transmitter station 21 and the antenna 26A of the receiver station 25 is mλ and a distance between the antenna 22B of the transmitter station 21 and the antenna 26B of the receiver station 25 is nλ. λ is a wavelength of the signals. m and n are arbitrary positive integers, and m can be equal to n (m=n). It is also assumed that an interval between the antennas 26A and 26B of the receiver station 25 is d, which is acquired by the following formula (6) based on an angle θ between the line connecting the antenna 22A of the transmitter station 21 and the antenna 26A of the receiver station 25 and the line connecting the antenna 22B of the transmitter station 21 and the antenna 26B of the receiver station 25.

$$d = \frac{\lambda/4}{\sin(\theta/2)} \quad (6)$$

When the antenna 26A of the receiver station 25 receives the signal x transmitted from the antenna 22A of the transmitter station 21, the reception signal is x because the distance between the antenna 22A and the antenna 26A is mλ. On the other hand, when the antenna 26A of the receiver station 25 receives the signal y transmitted from the antenna 22B of the transmitter station 21, the reception signal is $y \cdot \exp(-j\pi/2)$ because the distance between the antenna 22B and the antenna 26A is $n\lambda+\lambda/4$. Here, a transmission loss is ignored and it is assumed that the signal is a planer wave. Thus, the reception signal $r_1$ at the antenna 26A of the receiver station 25 is expressed by the following formula (7).

$$r_1 = x + y \cdot e^{-j(\pi/2)} \quad (7)$$

On the other hand, when the antenna 26B of the receiver station 25 receives the signal x transmitted from the antenna 22A of the transmitter station 21, the reception signal is $x \cdot \exp(-j\pi/2)$ because the distance between the antenna 22A and the antenna 26B is $m\lambda+\lambda/4$. Additionally, when the antenna 26B of the receiver station 25 receives the signal y transmitted from the antenna 22B of the transmitter station 21, the reception signal is y because the distance between the antenna 22B and the antenna 26B is $n\lambda$. Thus, the reception signal at the antenna 26B of the receiver station 25 is expressed by the following formula (8).

$$r_2 = x \cdot e^{-j(\pi/2)} + y \quad (8)$$

Here, a phase rotation of $\pi/2$ is given to the reception signal $r_2$ of the antenna 26B of the receiver station 25. The signal given the phase rotation is expressed by the following formula (9).

$$r_2 \cdot e^{j(\pi/2)} = x + y \cdot e^{j(\pi/2)} \quad (9)$$

By Summing the formula (7) and the formula (9), the following formula (10) is acquired.

$$r_1 + r_2 \cdot e^{j(\pi/2)} = x + y \cdot e^{-j(\pi/2)} + x + y \cdot e^{j(\pi/2)} \quad (10)$$
$$= 2x$$

Similarly, a phase rotation of $\pi/2$ is given to the reception signal $r_1$ of the antenna 26A of the receiver station 25. The signal given the phase rotation is expressed by the following formula (11).

$$r_1 \cdot e^{j(\pi/2)} = x \cdot e^{j(\pi/2)} + y \quad (11)$$

By summing the formula (8) and the formula (11), the following formula (12) is acquired.

$$r_1 \cdot e^{j(\pi/2)} + r_2 = x \cdot e^{j(\pi/2)} + y + x \cdot e^{-j(\pi/2)} + y \quad (12)$$
$$= 2y$$

As mentioned above, by setting the interval between the antennas 26A and 26B of the receiver station 25 to the distance d of the formula (6), the reception signal of the antenna 26A and the reception signal of the antenna 26B can be orthogonalized to each other, which permits the signal x and the signal y being easily separated from each other in the receiver station 25.

Moreover, the signal x transmitted from the antenna 22A and the signal y transmitted from the antenna 22B of the transmitter station 21 can be separated from each other easily by using a means such as an algorithm referred to as QRM-MLD known in the present technical field. QRM-MLD is an algorithm for reducing an amount of operation processes of the maximum-likelihood detector using QR factorization and M algorithm.

Figure 8:
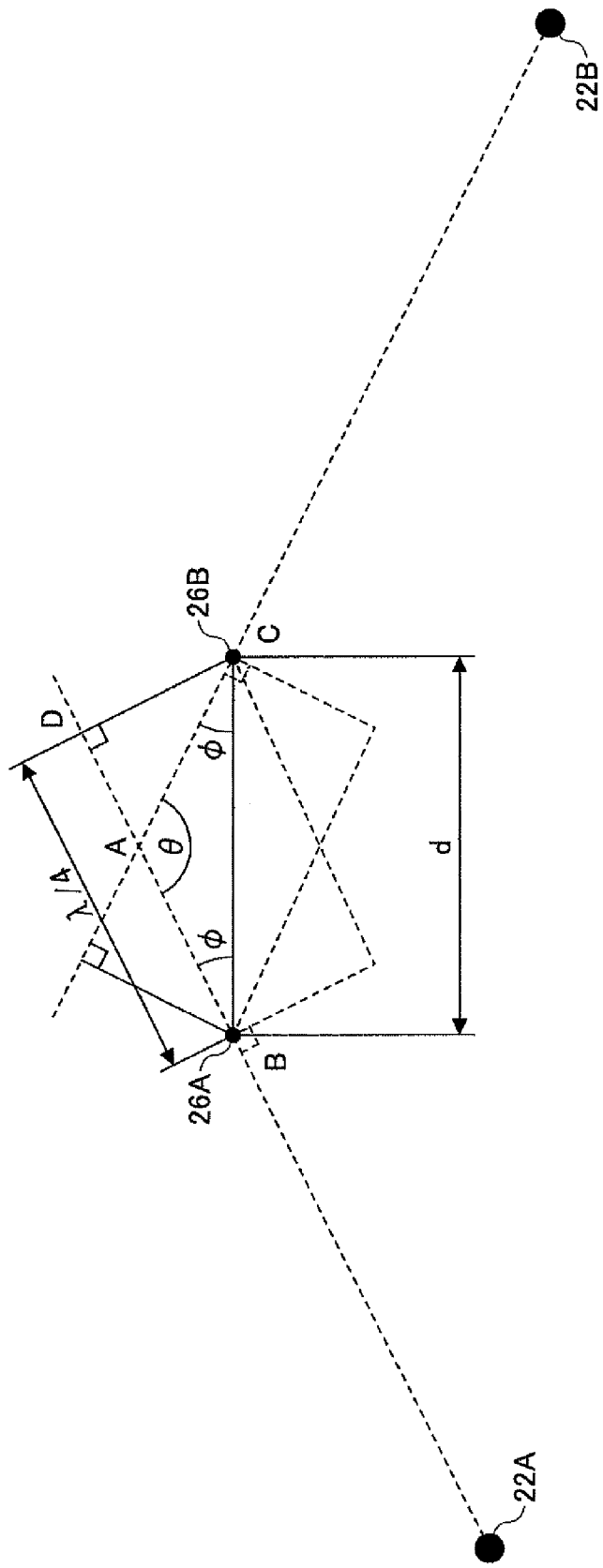
FIG. 8 is an enlarged view of FIG. 7.

A description will be given below, with reference to FIG. 8, of the meaning of the formula (6). FIG. 8 is an enlarged view of FIG. 7.

If the antennas 22A, 22B, 26A and 26B are arranged so that the triangle ABC forms an isosceles triangle, the orthogonality condition is satisfied. Because the triangle ABC is an isosceles triangle, the base angle $\phi$ is expressed by the following formula (13), where $\theta$ is an apex angle.

$$\phi = (180-\theta)/2 = 90-\theta/2 \quad (13)$$

Regarding the triangle CDB, if the side BD is $\lambda/4$, the following formula (14) is satisfied.

$$d \cdot \cos(\phi) = \lambda/4 \quad (14)$$

Accordingly, the following formula (15) is acquired.

$$d = \lambda/4/\cos(\phi) \quad (15)$$
$$= \lambda/4/\cos(90-\theta/2)$$
$$= \lambda/4/\sin(\theta/2)$$

Although the antenna interval is set to $\lambda/4$ in the above-mentioned explanation, the antenna interval may be $\lambda/4+N\lambda$ (N is a positive integer).

As mentioned above, in the antenna installation method according to the second embodiment, the angle formed by the line connecting the receiver station 25 and the antenna 22A of the transmitter station 21 and the line connecting the receiver station 25 and the antenna 22B of the transmitter station 21 is set to smaller than 180 degrees. This angle is preferably a blunt angle ($90°<\theta<180°$).

Additionally, although the distance between the antennas 26A and 26B of the receiver station 25 and the distance between the antennas 22A and 22B of the transmitter station 21 are set to specified distances determined by the signal wavelength $\lambda$, respectively, for the sake of simplification of the explanation, these distances may be set to arbitrary values.

Figure 9:
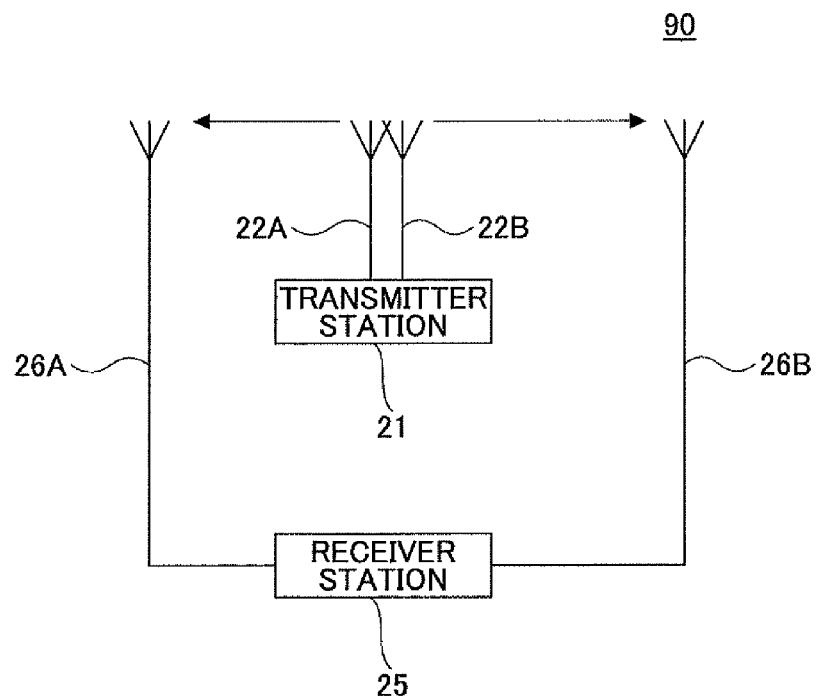
FIG. 9 is an illustration illustrating a structure of a radio communication system according to a third embodiment.

A description will be given below, with reference to FIG. 9, of a radio communication system 90 according to a third embodiment. In the radio communication system 90, the transmitter station and the receiver station are interchanged as compared to the radio communication system 20 illustrated in FIG. 2. In the radio communication system 90, the transmitter station 21 is arranged between the antennas 26A and 26B of the radio receiver station 25, and the antennas 22A and 22B of the transmitter station are arranged on the line connecting the antennas 26A and 26B of the receiver station 25.

Figure 10:
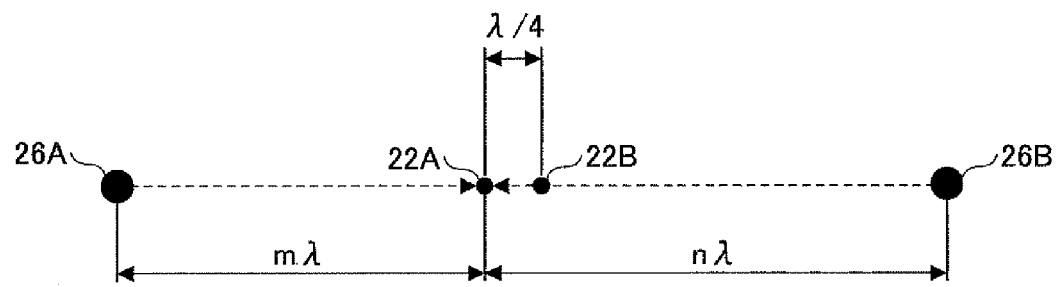
FIG. 10 is an illustration illustrating a positional relationship between the antennas of the transmitter station and the antennas of the receiver station illustrated in FIG. 9.

FIG. 10 is an illustration illustrating a positional relationship between the antennas 22A and 22B of the transmitter station and the antennas 26A and 26B of the receiver station 25.

A signal x is transmitted from the antenna 22A of the transmitter station 21, and a signal y is transmitted from the antenna 22B of the transmitter station 21. The signals x and y are received by the antennas 26A and 26B of the receiver station 25. Here, it is assumed that a distance between the antenna 22A of the transmitter station 21 and the antenna 26A of the receiver station 25 is $n\lambda$, and a distance between the antenna 22A of the transmitter station 21 and the antenna 26A of the receiver station 25 is $n\lambda$. It is also assumed that an interval between the antennas 26A and 26B of the receiver station 25 is $\lambda/4$.

For the sake of simplification of explanation, a transmission loss of a signal is ignored in the following explanation.

When the antenna 26A of the receiver station 25 receives the signal x transmitted from the antenna 22A of the transmitter station 21, the reception signal is x because the distance between the antenna 22A and the antenna 26A is $m\lambda$. On the other hand, when the antenna 26A of the receiver station 25 receives the signal y transmitted from the antenna 22B of the transmitter station 21, the reception signal is delayed by $\lambda/4$, that is, $\pi/2$ because the distance between the antenna 22B and the antenna 26A is $n\lambda+\lambda/4$. The reception signal at the antenna 26A of the receiver station 25 is expressed by the following formula (16).

$$r_1 = x + y \cdot e^{-j(\pi/2)} \quad (16)$$

On the other hand, when the antenna 26B of the receiver station 25 receives the signal x transmitted from the antenna 22A of the transmitter station 21, the reception signal is x because the distance between the antenna 22A and the antenna 26B is $n\lambda - \lambda/4$. Additionally, when the antenna 26B of the receiver station 25 receives the signal y transmitted from the antenna 22B of the transmitter station 21, the reception signal is $y \cdot \exp(j\pi/2)$ because the antenna interval is $n\lambda - \lambda/4$ and the phase advances by $\lambda/4$, that is, $\pi/2$.

Thus, the reception signal at the antenna 26B of the reception station 25 is expressed by the following formula (17).

$$r_2 = x + y \cdot e^{j(\pi/2)} \quad (17)$$

The following formula (18) is a sum of the formula (16) and the formula (17).

$$r_1 + r_2 = x + y \cdot e^{-j(\pi/2)} + x + y \cdot e^{j(\pi/2)} \quad (18)$$

$$= 2x$$

Additionally, a phase lead rotation of $\pi/2$ is given to the reception signal $r_1$ of the antenna 26A of the reception station 25, and a phase lag rotation of $\pi/2$ is given to the reception signal $r_2$ of the antenna 26B of the reception station 25. The sum of the signals to which the phase rotations are given is expressed by the following formula (19).

$$r_1 \cdot e^{j(\pi/2)} + r_2 \cdot e^{-j(\pi/2)} = x \cdot e^{j(\pi/2)} + y + x \cdot e^{-j(\pi/2)} + y \quad (19)$$

$$= 2y$$

As explained above, the reception signal of the antenna 26A and the reception signal of the antenna 26B can be orthogonalized to each other by arranging the antennas 22A and 22B of the transmitter station 21 on the line connecting the antennas 26A and 26B of the receiver station 25 with an antenna interval of $\lambda/4$. Moreover, the signal x transmitted from the antenna 22A and the signal y transmitted from the antenna 22B of the transmitter station 21 can be separated from each other easily by using a MIMO separation means such as QRM-MLD.

Although the antenna interval is set to $\lambda/4$ in the above explanation, the antenna interval may be set as $\lambda/4 + N\lambda$ (N is a positive integer).

As mentioned above, in the antenna installation method according to the third embodiment, the angle formed by the line connecting the transmitter station 21 and the antenna 26A of the receiver station 26 and the line connecting the transmitter station 21 and the antenna 26B of the reception station 25 is set to 180 degrees.

Additionally, although the distance between the antennas 26A and 26B of the receiver station 25 and the distance between the antennas 22A and 22B of the transmitter station 21 are set to specified distances determined by the signal wavelength $\lambda$, respectively, for the sake of simplification of the explanation, these distances may be set to arbitrary values.

A description will now be given of a fourth embodiment.

Figure 11:
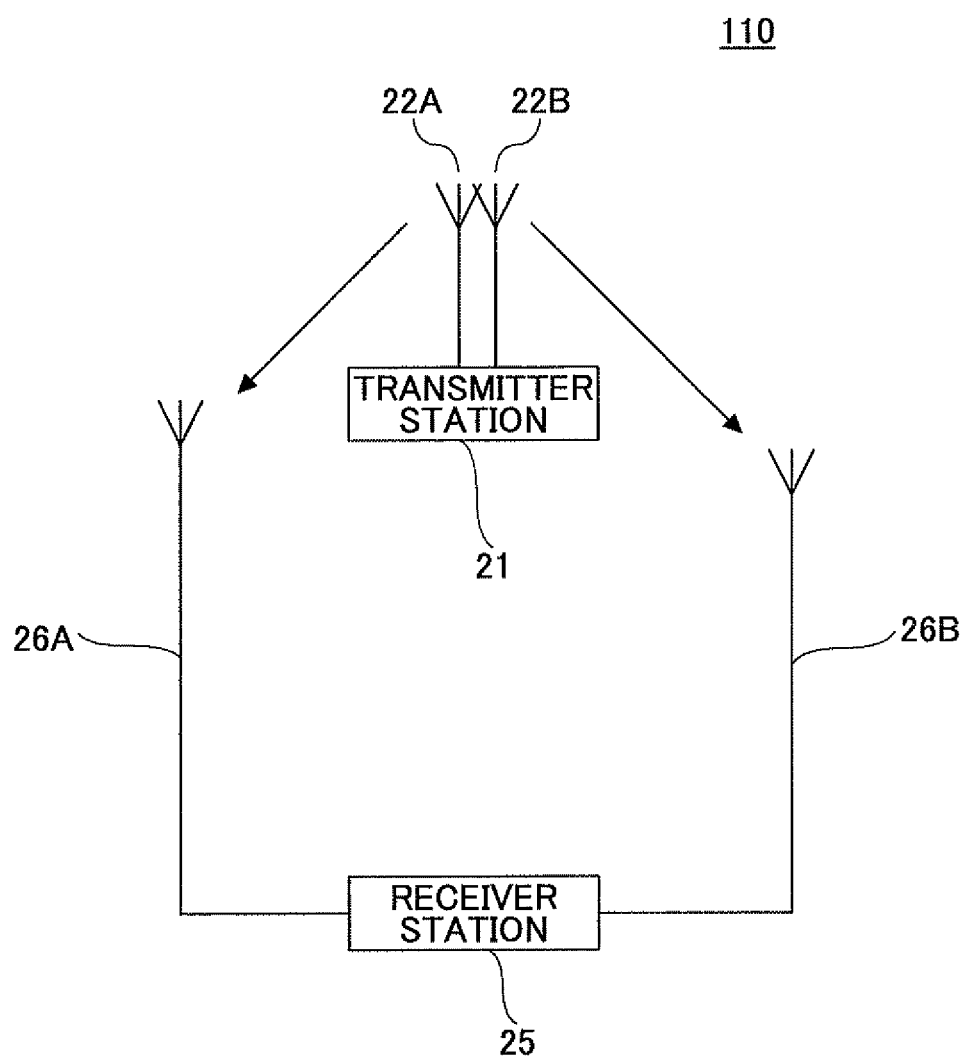
FIG. 11 is an illustration illustrating a structure of a radio communication system according to a fourth embodiment.

FIG. 11 is an illustration illustrating a structure of a radio communication system 110 according to the fourth embodiment. In the radio communication system 110, the radio transmitter station 21 is arranged between the antennas 26A and 26B of the radio receiver station 25. However, in the present embodiment, the antennas 22A and 22B of the transmitter 21 are not arranged on the line connecting the antennas 26A and 26B of the receiver station 21.

Figure 12:
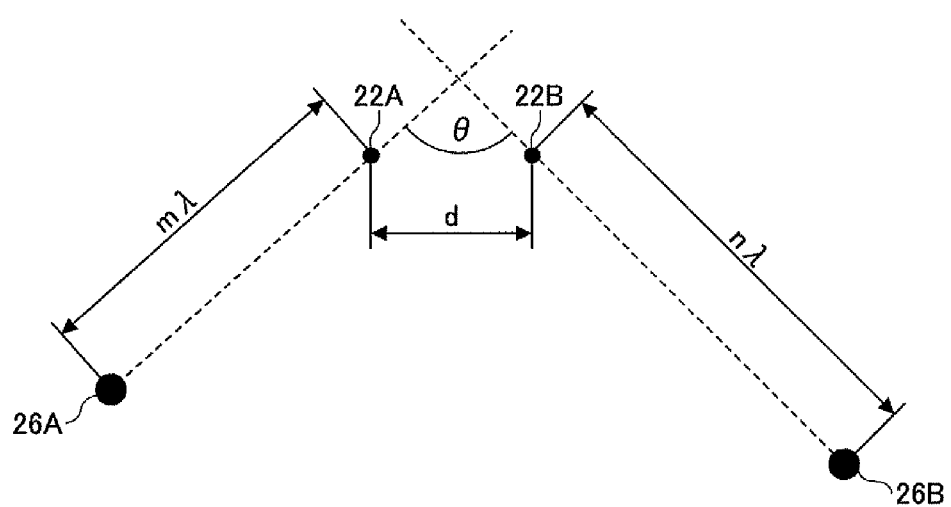
FIG. 12 is an illustration illustrating a positional relationship between the antennas of the transmitter station and the antennas of the receiver station 25 illustrated in FIG. 11.

FIG. 12 is an illustration illustrating a positional relationship between the antennas 22A and 22B of the transmitter station 21 and the antennas 26A and 26B of the receiver station 25 illustrated in FIG. 11.

A signal x is transmitted from the antenna 22A of the transmitter station 21, and a signal y is transmitted from the antenna 22B of the transmitter station 21. The signals x and y are received by the antennas 26A and 26B of the receiver station 25. Here, it is assumed that a distance between the antenna 22A of the transmitter station 21 and the antenna 26A of the receiver station 25 is $m\lambda$, and a distance between the antenna 22B of the transmitter station 21 and the antenna 26B of the receiver station 25 is $n\lambda$. It is also assumed that an interval between the antennas 22A and 22B of the transmitter station 21 is d, which is acquired by the following formula (20) based on an angle $\theta$ between the line connecting the antenna 22A of the transmitter station 21 and the antenna 26A of the receiver station 25 and the line connecting the antenna 22B of the transmitter station 21 and the antenna 26B of the receiver station 25.

$$d = \frac{\lambda/4}{\sin(\theta/2)} \quad (20)$$

When the antenna 26A of the receiver station 25 receives the signal x transmitted from the antenna 22A of the transmitter station 21, the reception signal is x because the distance between the antenna 22A and the antenna 26A is $m\lambda$. On the other hand, when the antenna 26A of the receiver station 25 receives the signal y transmitted from the antenna 22B of the transmitter station 21, the reception signal is $y \cdot \exp(-j\pi/2)$ because the distance between the antenna 22B and the antenna 26A is $m\lambda + \lambda/4$. Thus, the reception signal at the antenna 26A of the receiver station 25 is expressed by the following formula (21).

$$r_1 = x + y \cdot e^{-j(\pi/2)} \quad (21)$$

For the sake of simplification of explanation, a transmission loss is ignored and it is assumed that the signals are parallel signals.

On the other hand, when the antenna 26B of the receiver station 25 receives the signal x transmitted from the antenna 22A of the transmitter station 21, the reception signal is $x \cdot \exp(-j\pi/2)$ because the distance between the antenna 22A and the antenna 26B is $n\lambda + \lambda/4$. Additionally, when the antenna 26B of the receiver station 25 receives the signal y transmitted from the antenna 22B of the transmitter station 21, the reception signal is y because the distance between the antenna 22B and the antenna 26B is $n\lambda$. Thus, the reception signal at the antenna 26B of the receiver station 25 is expressed by the following formula (22).

$$r_2 = x \cdot e^{-j(\pi/2)} + y \quad (22)$$

Here, a phase rotation of $\pi/2$ is given to the reception signal $r_2$ of the antenna 26B of the receiver station 25. The signal given the phase rotation is expressed by the following formula (23).

$$r_2 \cdot e^{j(\pi/2)} = x + y \cdot e^{j(\pi/2)} \quad (23)$$

By summing the formula (21) and the formula (23), the following formula (24) is acquired.

$$r_1 + r_2 \cdot e^{j(\pi/2)} = x + y \cdot e^{-j(\pi/2)} + x + y \cdot e^{j(\pi/2)} \quad (24)$$

32 $2x$

Similarly, a phase rotation of $\pi/2$ is given to the reception signal $r_1$ of the antenna 26A of the receiver station 25. The signal given the phase rotation is expressed by the following formula (25).

$$r_1 \cdot e^{j(\pi/2)} = x \cdot e^{j(\pi/2)} + y \quad (25)$$

By summing the formula (22) and the formula (25), the following formula (26) is acquired.

$$r_1 \cdot e^{j(\pi/2)} + r_2 = x \cdot e^{j(\pi/2)} + y + x \cdot e^{-j(\pi/2)} + y \quad (26)$$

$$= 2y$$

As mentioned above, by setting the interval between the antennas 22A and 22B of the transmitter station 21 to the distance d of the formula (20), the reception signal of the antenna 26A and the reception signal of the antenna 26B can be orthogonalized to each other, which permits the signal x and the signal y being easily separated from each other in the receiver station 25.

Moreover, the signal x transmitted from the antenna 22A and the signal y transmitted from the antenna 22B of the transmitter station 21 can be separated from each other easily by using a MIMO separation means such as QRM-MLD.

Although the antenna interval is set to $\lambda/4$ in the above-mentioned explanation, the antenna interval may be $\lambda/4 + N\lambda$ (N is a positive integer).

As mentioned above, in the antenna installation method according to the fourth embodiment, the angle formed by the line connecting the transmitter station 21 and the antenna 26A of the receiver station 25 and the line connecting the transmitter station 21 and the antenna 26B of the receiver station 25 is set to smaller than 180 degrees. This angle is preferably a blunt angle.

Additionally, although the distance between the antennas 26A and 26B of the receiver station 25 and the distance between the antennas 22A and 22B of the transmitter station 21 are set to specified distances determined by the signal wavelength $\lambda$, respectively, for the sake of simplification of the explanation, these distances may be set to arbitrary values.

Figure 13:
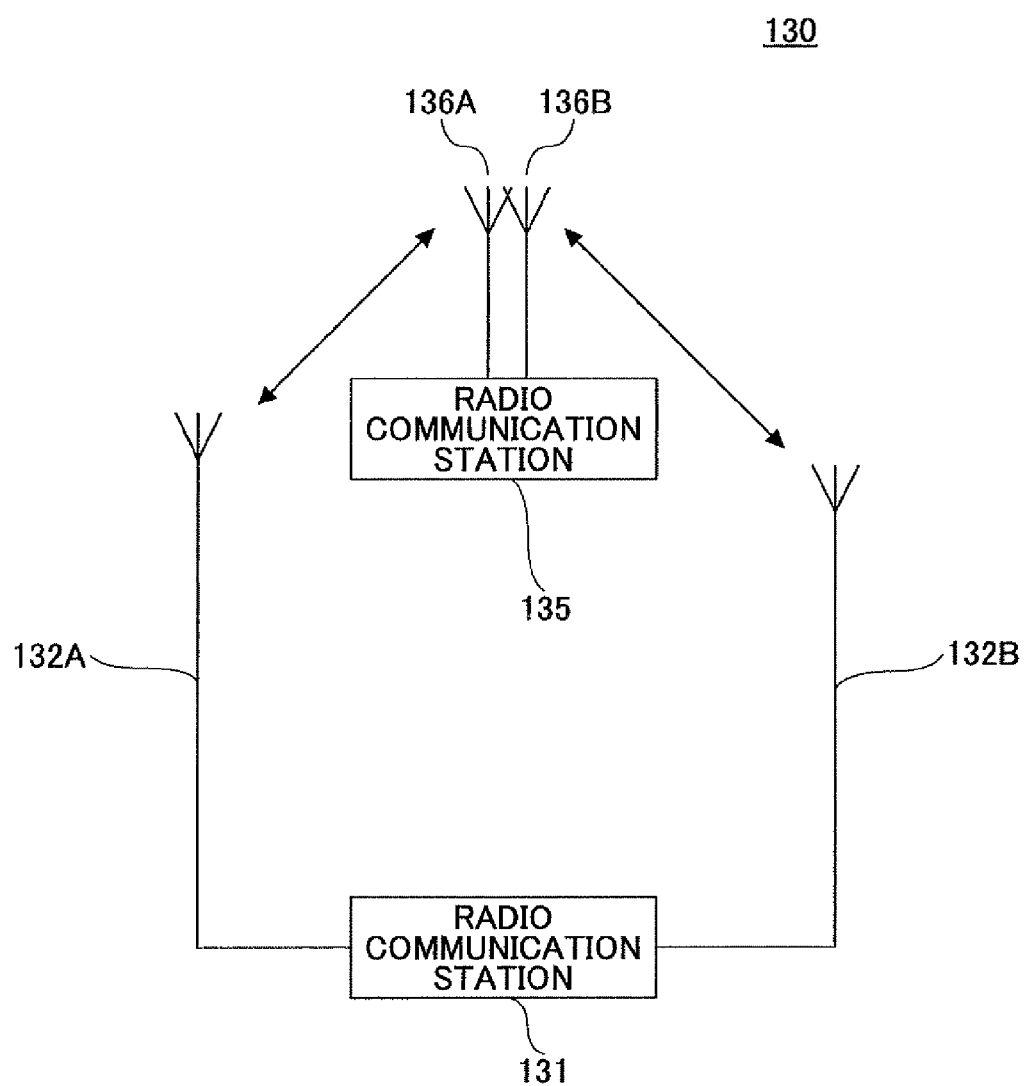
FIG. 13 is an illustration illustrating a radio communication system according to a fifth embodiment.

A description will now be given of a radio communication system according to a fifth embodiment. FIG. 13 is an illustration illustrating the radio communication system 130 according to the fifth embodiment. A radio communication station 135 is arranged between two transceiver antennas 132A and 132B of a radio communication station 131. Transceiver antennas 136A and 136B of the radio communication station 135 are arranged on a line connecting the transceiver antennas 132A and 132B of the radio communication station 131. The antennas 136A, 136B, 132A and 132B are arranged in the positional relationship explained with reference to FIG. 5 and FIG. 10.

Alternatively, the transceiver antennas 136A and 136B of the radio communication station 135 are not arranged on the line connecting the transceiver antennas 132A and 132B of the radio communication station 131, but arranged in the positional relationship explained with reference to FIG. 7 and FIG. 12. It is apparent for a person skilled in the art that the structure of one of the first to fourth embodiments can be applied to the communication between the radio communication stations 131 and 135 in the radio communication system 130.

Figure 14:
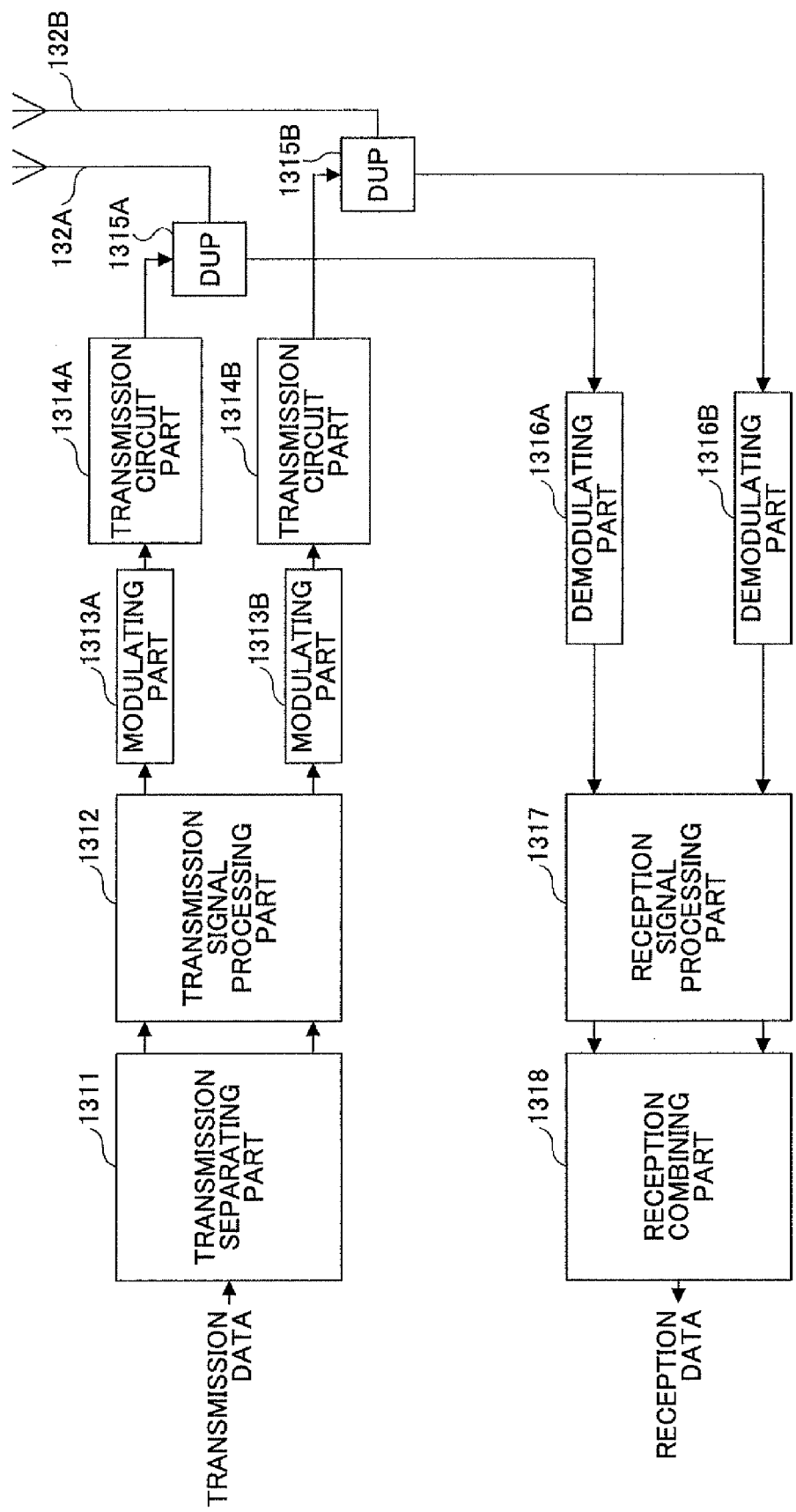
FIG. 14 is a block diagram of a radio communication station illustrated in FIG. 13.

FIG. 14 is a block diagram of the radio communication station 131 (or 135) according to the fifth embodiment. In addition to the plurality of antennas 132A and 132B (in the case of the radio communication station 135, antennas 136A and 136B), the radio communication station 131 (or the radio communication station 135) includes transmission separating part 1311, a transmission signal processing part 1312, demodulating parts 131A and 131B, and transmission circuit parts 1314A and 1314B.

Transmission data is divided into transmitting streams of a number the same as the number of the antennas. The transmission streams are transmission-processed by the transmission signal processing part 1312. The processed transmission streams are demodulated by the demodulating parts 1313A and 1313B, respectively, and, then, the transmission streams are transmitted via radio frequencies from the antennas 132 and 132A through duplexers, respectively.

On the other hand, the radio communication station 131 includes duplexers 1315A and 1315B, demodulating parts 1316A and 1316B, a reception signal processing part 1317, and a reception combining part 1318.

Signals received by the antennas 132A and 132B are separated from the transmission signal side by the duplexers 1315A and 1315B, respectively, and, then, amplified and demodulated by the demodulating parts 1316A and 1316B, respectively. The demodulated reception signals are separated and processed to be reception streams of a number the same as the number of antennas by the reception signal processing part 1317 using a channel response matrix. The processed reception streams are combined to generate reception data in the reception combining part 1318.

Thus, the angle δ formed by the line connecting the radio communication station 135 and the antenna 132A of the radio communication station 131 and the line connecting the radio communication station 135 and the antenna 132B of the radio communication station 131 is smaller than 180 degrees. This angle is preferably a blunt angle (90°<θ<180°)

Additionally, although the distance between the antennas 136A and 136B of the radio communication station 135 and the distance between the antennas 132A and 132B of the radio communication station 131 are set to specified distances determined by the signal wavelength $\lambda$, respectively, for the sake of simplification of the explanation, these distances may be set to arbitrary values.

Figure 15:
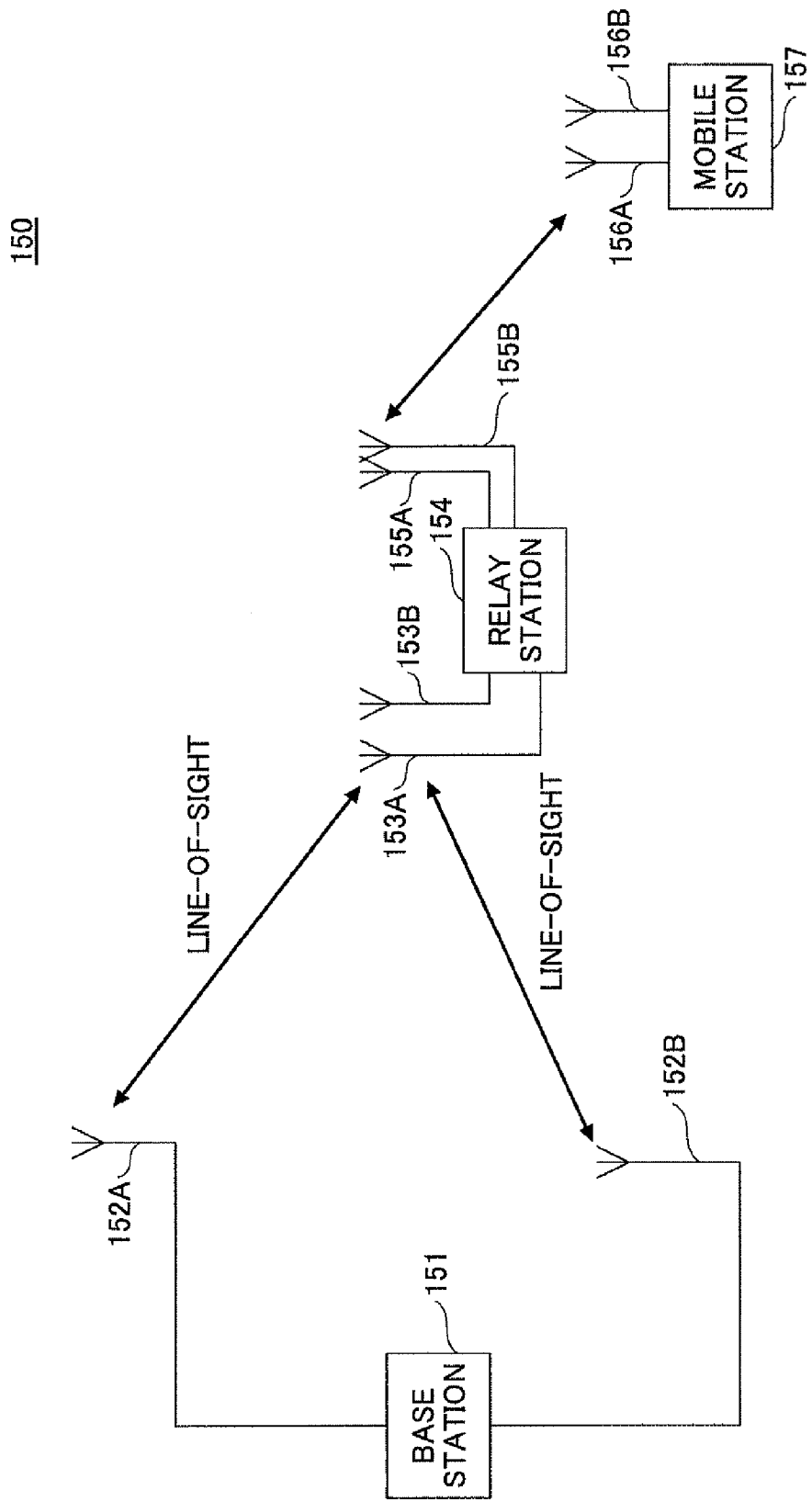
FIG. 15 is an illustration illustrating a radio communication system according to a sixth embodiment.

A description will be given below, with reference to FIG. 15, of a radio communication system according to a sixth embodiment. FIG. 15 is an illustration illustrating a radio communication system 150 according to the sixth embodiment.

The radio communication system 150 is an example in which one of the above-mentioned structures is applied to a relay station. The radio communication system 150 includes a base station 151, a relay station 154, and a mobile station 157.

The relay station 154 is arranged between two transceiver antennas 152A and 152B of the base station 151. The base station side transceiver antennas 153A and 153B of the relay station 154 are arranged on a line connecting the two transceiver antennas 152A and 152B of the base station 151, and has the positional relationship explained with reference to FIG. 5 and FIG. 10. Alternatively, the base station side transceiver antennas 153A and 153B of the relay station 154 are not arranged on the line connecting the two transceiver antennas 152A and 152B of the base station 151, and has the positional relationship explained with reference to FIG. 7 and FIG. 12. The relay station 154 is capable of exchanging signals with the mobile station 157, which has the transceiver antennas 156A and 156B, through mobile station side transceiver antennas 155A and 155B.

Figure 16:
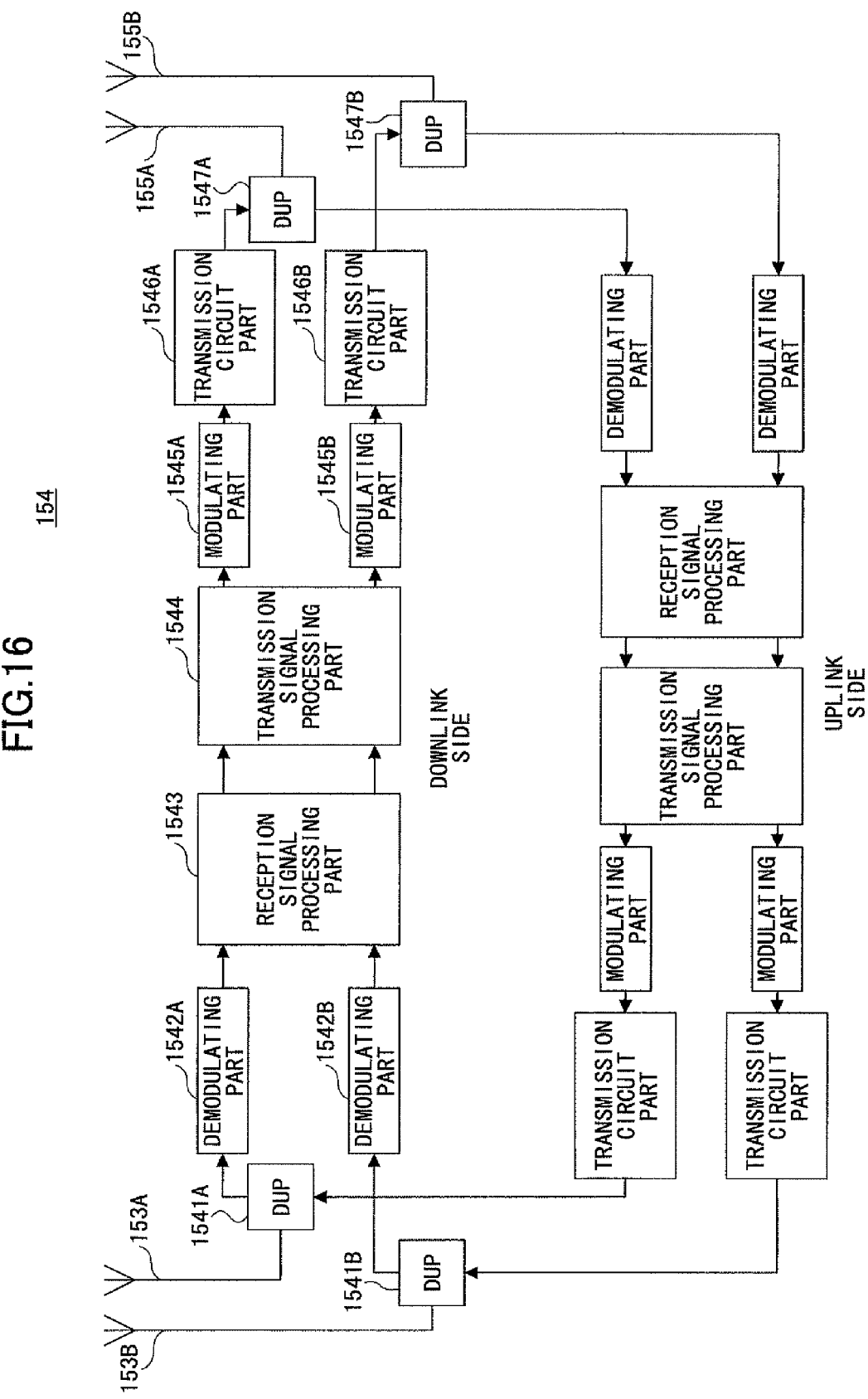
FIG. 16 is a block diagram illustrating a structure of a relay station illustrated in FIG. 15.

FIG. 16 is a block diagram illustrating a structure of the relay station 154. The relay station 154 has a downlink side where signals from the base station to the mobile station flow, and an uplink side where signals from the mobile station to the base station flow. Because structures of the downlink side and the uplink side are basically the same, a description will be given of the downlink side only.

In addition to the plurality of base station side antennas 153A and 153B, the downlink side of the relay station 154 is provided with duplexers 1541A and 1541B, demodulating parts 1542A and 1542B and the reception signal processing part 1543. Signals received by the antennas 153A and 153B are separated from the uplink side by the duplexers 1541A and 1541B, and amplified and demodulated by the demodulating parts 1542A and 1542B, respectively. The demodulated reception signals are separated into reception streams of a number the same as a number of antennas by the reception signal processing part 1543 using a channel response matrix.

The downlink side of the relay station 154 is further provided with a transmission signal processing part 1544, modulating parts 1545A and 1545B, transmission circuit parts 1546A and 1546B, and duplexers 1547A and 1547B.

The separation-processed reception streams are transmission-processed by the transmission signal processing part 1544 as transmission streams. The transmission-processed transmission streams are modulated by the modulating parts 1545A and 1545B, respectively, and amplified to a desired power by the transmission circuit parts 1546A and 1546B. Then, the amplified transmission streams are transmitted as radio frequencies from the movable station side antennas 155A and 155B through the duplexers 1547A and 1547B, which separate the transmission streams from uplink side signals.

Normally, the base station 151 (FIG. 15) and the relay station 154 (FIG. 15) of a mobile communication system are arranged within a line-of-sight range. Thus, it may be difficult to perform a MIMO communication because a change in the channel response matrix is small between the base station and the relay station. However, a MIMO communication is attained by applying the above-mentioned embodiments to the base station and the relay station. The antennas of the base station are arranged separate from each other as a distributed antenna. The base station side transceiver antennas of the relay station are arranged on the line connecting the two transceiver antennas of the base station so that the positional relationship explained with reference to FIG. 5 and FIG. 10 is satisfied. Alternatively, the base station side transceiver antennas of the relay station are not arranged on the line connecting the two transceiver antennas of the base station so that the positional relationship explained with reference to FIG. 7 and FIG. 12 is satisfied. Because the antennas of the relay station are stationary, the positional relationship between the antenna of the base station and the antennas of the relay station is not changed.

Normally, because a height of the antennas of the mobile station is not large, when signals from the relay station are received by the antenna of the mobile station, a multipath reaches in a wide angle range. Thereby, a change in the channel response matrix is large, which permits a MIMO communication being performed.

Thus, in the antenna installation method according to the sixth embodiment, the angle θ formed by the line connecting the relay station 154 and the antenna 152A of the base station 151 and the line connecting the relay station 154 and the antenna 152B of the base station 151 is smaller than 180 degrees. This angle is preferably a blunt angle (90°<θ<180°).

Additionally, although the distance between the antennas 153A and 153B of the relay station 154 and the distance between the antennas 152A and 152B of the base station 151 are set to specified distances determined by the signal wavelength λ, respectively, for the sake of simplification of the explanation, these distances may be set to arbitrary values.

Figure 17:
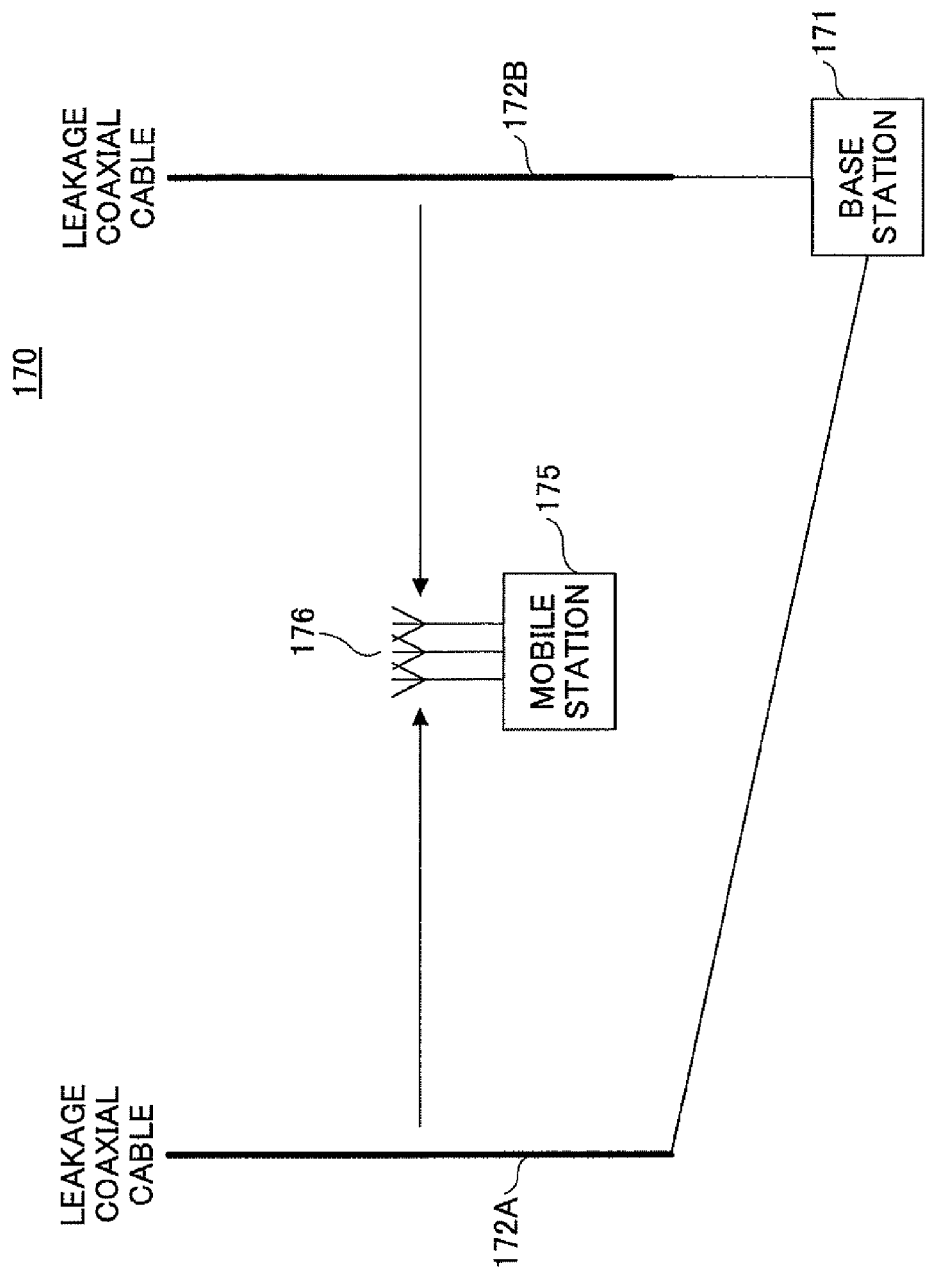
FIG. 17 is an illustration of a mobile communication system according to a seventh embodiment.

A description will be given below, with reference to FIG. 17, of a mobile communication system according to a seventh embodiment. FIG. 17 is an illustration of a mobile communication system 170 according to the seventh embodiment.

For example, the mobile communications system 170 is arranged in an interior of a room. Normally, in consideration of a propagation property, antennas 172A and 172B of a base station 171 are located at high positions close to a ceiling. Thus, in the interior of the room, the communication between antennas 176 of a mobile station 175 and the antennas 172A and 172B of the base station 171 becomes a line-of-sight communication, and it may be difficult to perform a MIMO communication. However, in the mobile communication system 170, leakage coaxial cables serving as the antennas 172A and 172B are arranged along the sides where the two opposite walls intersect with the ceiling in the interior of the room. The mobile station 175 is always positioned between the two antennas 172A and 172B of the base station 171.

In the case of the mobile station 175, a relationship between the antennas 176 of the mobile station 175 and the antennas 172A and 172B of the base station 171 changes with movement of the mobile station 175. Thus, by providing three or more antennas 176 to the mobile station 175 in a polygonal shape (for example, triangle), a MIMO separation can be performed even if the mobile station 175 moves and the positional relationship of the antennas is changed.

Figure 18:
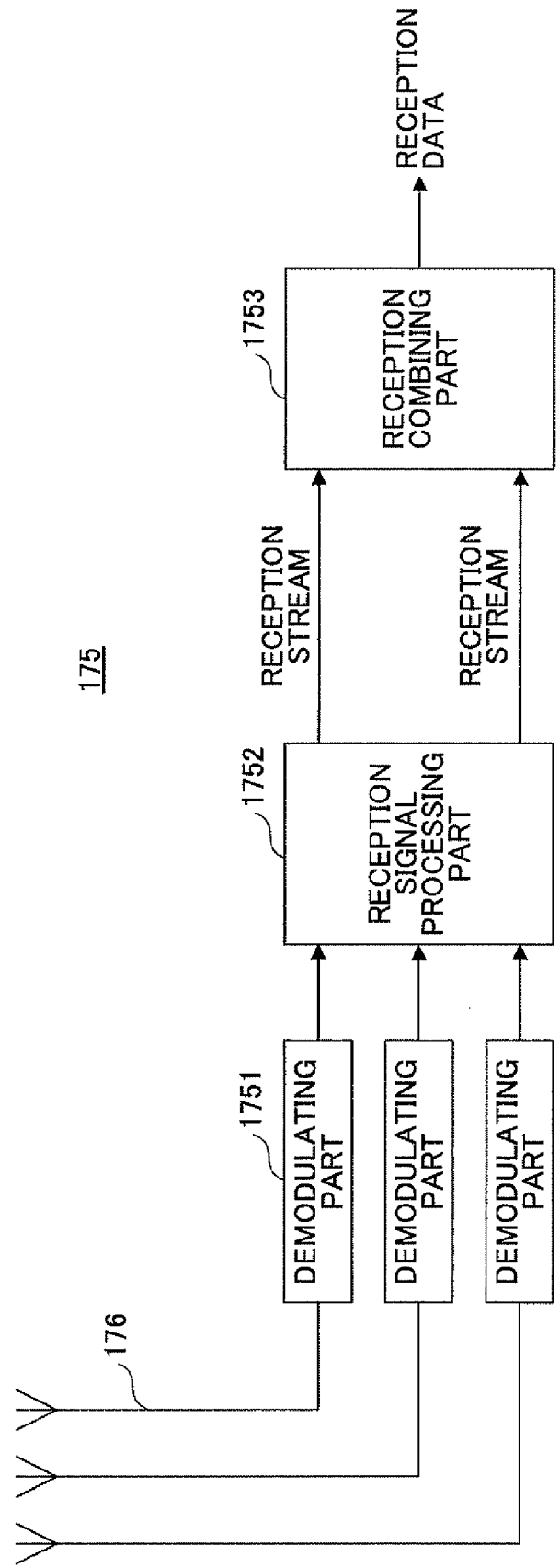
FIG. 18 is a block diagram of a structure of a mobile station of the mobile communication system illustrated in FIG. 17.

FIG. 18 is a block diagram of a structure of the mobile station 175. In addition to the plurality of (three or more) antennas 176, the mobile station 175 includes demodulating parts 1751 corresponding to the antennas 176, a reception signal processing part 1752, and a reception combining part 1753. The signals received by the antennas 176 are amplified and demodulated by the demodulating parts 1751, respectively. The demodulated reception signals are separated into reception streams by the reception signal processing part 1752 using a channel response matrix. The separated reception streams are combined to produce reception data by the reception combining part 1753.

As mentioned above, in the antenna installation method according to the seventh embodiment, the angle θ formed by the line connecting the mobile station 175 and the antenna 172A of the base station 111 and the line connecting the mobile station 175 and the antenna 172B of the base station 171 is smaller than 180 degrees.

Additionally, although the distance between the antennas 176 of the mobile station 175 and the distance between the antennas 172A and 172B of the base station 171 are set to specified distances determined by the signal wavelength λ, respectively, for the sake of simplification of the explanation, these distances may be set to arbitrary values.

Each of the above-mentioned embodiments is applicable to communication techniques such as, for example, a cellular phone technique after the 3.9 generation (LTE), a technique of a next generation PHS, a technique used in WiMAX, or a technique according to IEEE802.20, IEEE802.11n, etc.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An antenna installation method in a radio communication system that is configured and arranged to transmit different signals from a plurality of antennas of a second communication apparatus using the same frequency band and receives the signals by a plurality of antennas of a first communication apparatus, the antennas of said first communication apparatus including at least first and second antennas, the antennas of said second communication apparatus including at least first and second antennas, the first communication apparatus being arranged between the first and second antennas of said second communication apparatus, the antenna installation method comprising:

setting an angle formed by a first line connecting said first communication apparatus and said first antenna of said second communication apparatus and a second line connecting said first communication apparatus and said second antenna of said second communication apparatus to be equal to or smaller than 180 degrees; and setting a first distance between said first communication apparatus and said first antenna of said second communication apparatus and a second distance between said first communication apparatus and said second antenna of said second communication apparatus to be specified values determined by a signal wavelength and said angle formed by said first line and said second line, respectively, wherein, when said angle formed by said first line and said second line is smaller than 180 degrees, an intersection point between said first line and said second line, said first antenna of said first communication apparatus, and said second antenna of said first communication apparatus are arranged to form an isosceles triangle, and wherein a distance between said first and second antennas of said first communication apparatus is determined by a formula $$d = \frac{(1/4 + N)\lambda}{\sin(\theta/2)}$$

where d is the distance, N is an integer equal to or larger than zero, $\lambda$ is the signal wavelength, and $\theta$ is the angle formed by said first line and said second line.

2. The antenna installation method according to claim 1, wherein a distance between said first and second antennas of said first communication apparatus is set to $(1/4+N)\lambda$, where $\lambda$ is the signal wavelength and N is an integer equal to or larger than zero.

3. The antenna installation method according to claim 1, wherein the angle formed by said first line and said second line is a blunt angle.

4. A communication apparatus configured to communicate with another communication apparatus using a communication method in which different signals are transmitted from a plurality of antennas of said communication apparatus and the signals are received by a plurality of antennas of said another communication apparatus, said communication apparatus comprising:

a first antenna; and a second antenna arranged in a specified positional relationship with said first antenna, the another communication apparatus being arranged between the first and second antennas, wherein an angle formed by a first line connecting said another communication apparatus and said first antenna and a second line connecting said another communication apparatus and said second antenna is set to be equal to or smaller than 180 degrees;

a distance between a first antenna and a second antenna of said another communication apparatus is set to a specified value, which is determined by a signal wavelength and said angle formed by said first line and said second line;

when said angle is smaller than 180 degrees, an intersection point between said first line and said second line, said first antenna of said another communication apparatus, and said second antenna of said another communication apparatus are arranged to form an isosceles triangle; and a distance between said first and second antennas of said another communication apparatus is determined by a formula $$d = \frac{(1/4 + N)\lambda}{\sin(\theta/2)}$$

where d is the distance, N is an integer equal to or larger than zero, $\lambda$ is the signal wavelength, and $\theta$ is the angle formed by said first line and said second line.

5. The communication apparatus according to claim 4, wherein said angle is set to 180 degrees, and said specified value is set to $(1/4+N)\lambda$, where $\lambda$ is the signal wavelength and N is an integer equal to or larger than zero.

6. The communication apparatus according to claim 4, wherein the angle formed by said first line and said second line is a blunt angle.

7. A communication apparatus configured to communicate with another communication apparatus using a communication method in which different signals are transmitted from a plurality of antennas of said communication apparatus and the signals are received by a plurality of antennas of said another communication apparatus, said communication apparatus comprising:

a first antenna; and a second antenna arranged in a specified positional relationship with said first antenna, the another communication apparatus being arranged between the first and second antennas, wherein an angle formed by a first line connecting said communication apparatus and a first antenna of said another communication apparatus and a second line connecting said communication apparatus and a second antenna of said another communication apparatus is set to be equal to or smaller than 180 degrees;

a distance between said first and second antennas of said communication apparatus is set to a specified value, which is determined by a signal wavelength and the angle formed by said first line and said second line;

when the angle formed by said first line and said second line is smaller than 180 degrees, an intersection point between said first line and said second line, said first antenna of said communication apparatus, and said second antenna of said communication apparatus are arranged to form an isosceles triangle; and a distance between said first and second antennas of said communication apparatus is determined by a formula $$d = \frac{(1/4+N)\lambda}{\sin(\theta/2)}$$

where d is the distance, N is an integer equal to or larger than zero, λ is the signal wavelength, and θ is the angle formed by said first line and said second line.

8. The communication apparatus according to claim 7, wherein said angle is set to 180 degrees, and said specified value is set to (¼+N)λ, where λ is the signal wavelength and N is an integer equal to or larger than zero.

9. The communication apparatus according to claim 7, wherein the angle formed by said first line and said second line is a blunt angle.

10. A communication system comprising:
- a first communication apparatus having at least a first antenna and a second antenna that are arranged in a specified positional relationship; and
- a second communication apparatus having at least a first antenna and a second antenna that are arranged in a specified positional relationship, the first communication apparatus being arranged between the first and second antennas of said second communication apparatus,
- wherein said second communication apparatus transmits different signals from said first and second antennas of said second communication apparatus, and said first and second antennas of said first communication apparatus receive the signals, respectively, and
- wherein an angle formed by a first line connecting said first communication apparatus and said first antenna of said second communication apparatus and a second line connecting said first communication apparatus and said second antenna of said second communication apparatus is set to be equal to or smaller than 180 degrees;
- a distance between said first and second antennas of said first communication apparatus is set to a specified value, which is determined by a signal wavelength and the angle formed by said first line and said second line;
- when the angle formed by said first line and said second line is smaller than 180 degrees, an intersection point between said first line and said second line, said first antenna of said first communication apparatus, and said second antenna of said first communication apparatus are arranged to form an isosceles triangle; and
- a distance between said first and second antennas of said first communication apparatus is determined by a formula $$d = \frac{(1/4+N)\lambda}{\sin(\theta/2)}$$

where d is the distance, N is an integer equal to or larger than zero, λ is the signal wavelength, and θ is the angle formed by said first line and said second line.

11. The communication system according to claim 10, wherein the angle formed by said first line and said second line is a blunt angle.

12. The communication system according to claim 10, wherein said first communication apparatus is a relay station.

* * * * *